United States Patent [19]

Someya

[11] Patent Number: 5,150,207
[45] Date of Patent: Sep. 22, 1992

[54] VIDEO SIGNAL TRANSMITTING SYSTEM
[75] Inventor: Ikuo Someya, Tokyo, Japan
[73] Assignee: Sony Corporation, Tokyo, Japan
[21] Appl. No.: 695,712
[22] Filed: Feb. 15, 1991
[30] Foreign Application Priority Data
  Feb. 20, 1990 [JP] Japan .................................. 2-039526
[51] Int. Cl.⁵ .......................... H04N 7/12; H04N 7/04
[52] U.S. Cl. .................................... 358/133; 358/141; 358/105; 358/12
[58] Field of Search ............... 358/133, 135, 136, 138, 358/140, 141, 11, 12

[56] References Cited
U.S. PATENT DOCUMENTS

| | | | |
|---|---|---|---|
| 4,965,667 | 10/1990 | Trew et al. | 358/141 |
| 4,873,573 | 10/1989 | Thomas et al. | 358/133 |
| 4,924,308 | 5/1990 | Feuchtwanger | 358/133 |
| 4,984,077 | 1/1991 | Uchida | 358/140 |
| 4,985,767 | 1/1991 | Haghiri et al. | 358/133 |
| 5,031,039 | 7/1991 | Haghiri et al. | 358/105 |

Primary Examiner—John K. Peng
Assistant Examiner—Michael H. Lee
Attorney, Agent, or Firm—Alvin Sinderbrand; William S. Frommer

[57] ABSTRACT

An image signal transmitting system which comprises a first field offset sub-sampling circuit for processing a first image signal as a still image, the first image signal being in a relatively lower region of temporal motion frequency in a motion frequency band, a frame/line offset sub-sampling circuit for processing the first image signal, a line offset sub-sampling circuit for processing a second image signal as a moving image, the second image signal being in a relatively higher region of temporal motion frequency in the motion frequency band, a second field offset sub-sampling circuit for processing a third image signal, the third image signal being a middle region of temporal motion frequency in the motion frequency band between the lower temporal frequency region and the higher temporal frequency region, whereby the third image signal is sub-sampled only by the second field offset sub-sampling circuit, and each of the sub-sampling circuits has the same sampling points for the first, second and third image signals.

7 Claims, 16 Drawing Sheets

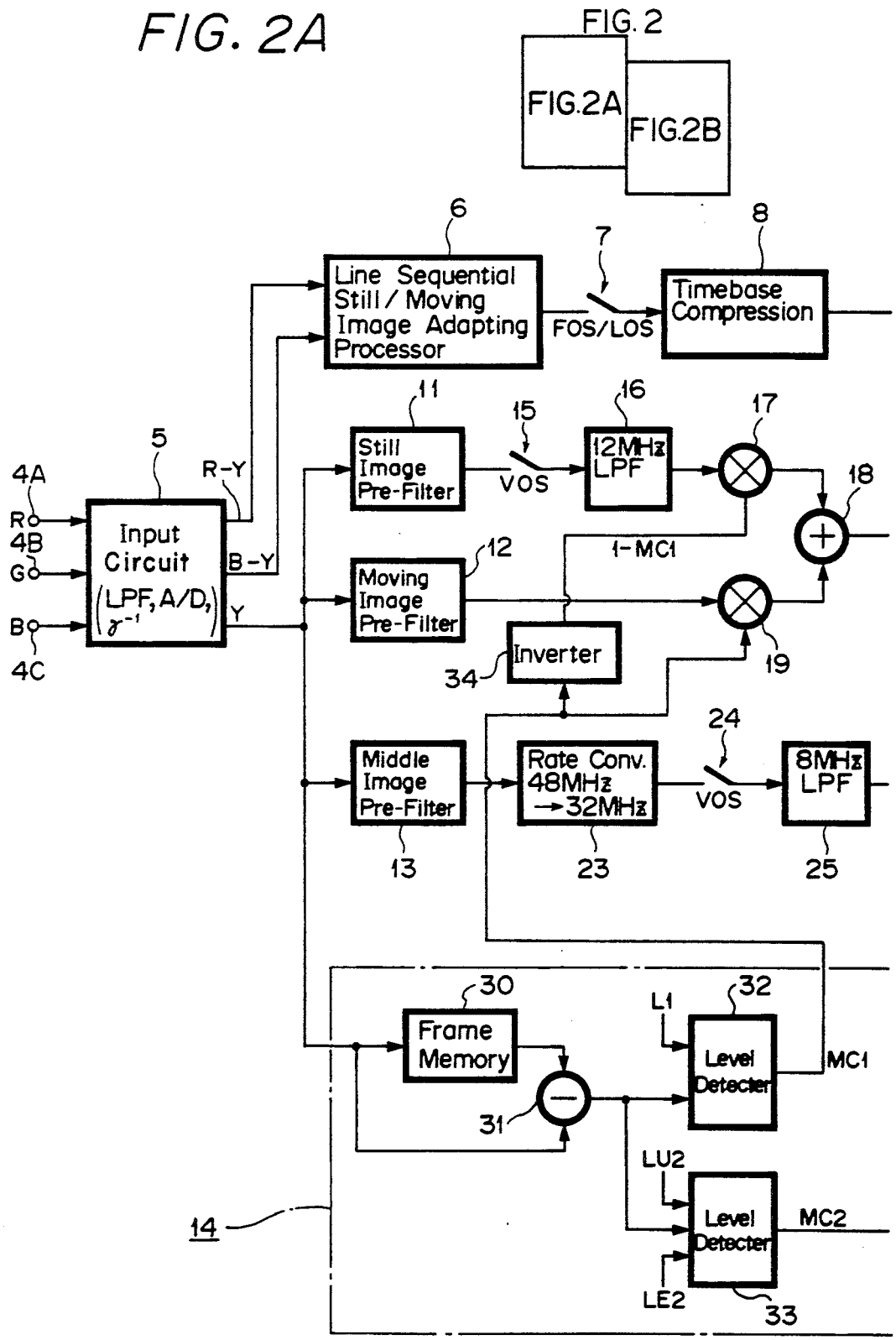

Still Image Pre-Filter

Moving Image Pre-Filter

Middle Image Pre-Filter

Pre-Filter

Rate Conversion

FOS/LOS

—o——o— Current Field
—•---•— Previous Field
*FIG. 8A*
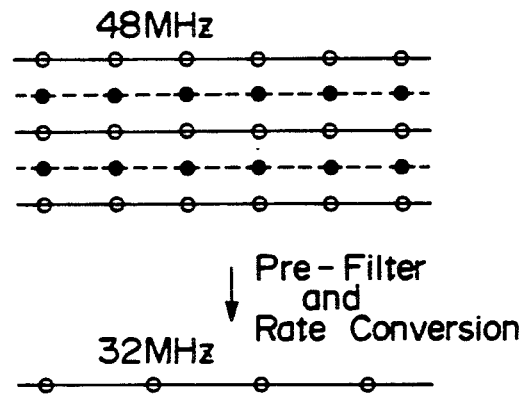
48MHz
↓ Pre-Filter and Rate Conversion
*FIG. 8B*
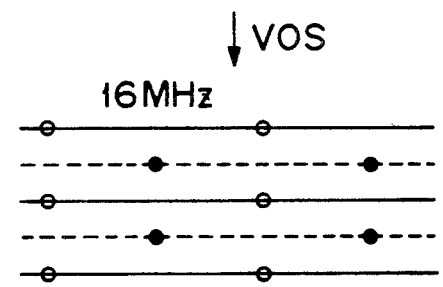
32MHz
↓ VOS
*FIG. 8C*
16MHz
↓ 8MHz LPF
*FIG. 8D*
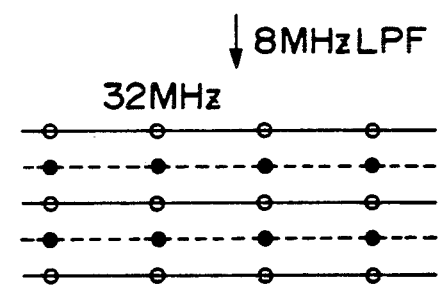
32MHz
↓ Sampling
*FIG. 8E*
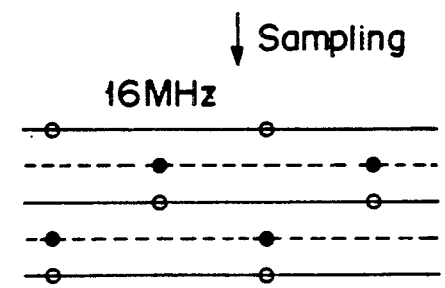
16MHz

VIDEO SIGNAL TRANSMITTING SYSTEM

BACKGROUND OF THE INVENTION

1. Field of the Invention

The present invention relates to a video signal transmitting system suitable for use in transmitting, for example, high vision signals (i.e., high definition signals) with a compressed frequency band.

2. Description of the Prior Art

For broadcasting a high vision (high definition) signal over one channel having a bandwidth of 27 MHz via satellite broadcasting wherein an FM modulation system is employed, the high definition television signal having a bandwidth ranging approximately from 20 to 25 MHz must be compressed to a bandwidth of about 9 MHz or less. For this purpose there has been developed the MUSE (Multiple Sub-Nyquist-Sampling Encoding) system which can compress the base band width of the high definition television signal to 8.1 MHz for broadcasting the high definition television signal over one channel of the satellite broadcasting system without substantially affecting the quality of the high definition image.

An encoder in accordance with the MUSE system performs frequency band compression of a video signal by converting an analog video signal to a digital video signal and then reducing the sampling rate of the sample pattern (known as sub-sampling). The video signal is represented by three dimensional axes, i.e., the horizontal axis, the vertical axis and the time direction axis, and sub-sampling can be performed along any of these three dimensional axes or along an arbitrary axis crossing these three dimensional axes. A ½ sub-sampling along any of these axes results in reducing the resolution of the video signal in the direction of that axis by a factor of 2.

The MUSE system makes use of the fact that the resolution of the human eye is lowered with respect to a moving image. Accordingly, the MUSE system detects whether each pixel is a still pixel or a moving pixel by use of a movement detector to adaptively change the sub-sampling system of the input signal which normally exhibits a sampling frequency of 48.6 MHz.

More specifically, a still pixel area, also known as a still image area, is subjected to the sequential processing of a field offset sub-sampling (hereinafter called "VOS") with a clock frequency of 24.3 MHz, followed by interpolation filtering at 12 MHz, followed by conversion of the sub-sampling frequency to 32.4 MHz and followed by a frame offset sub-sampling with a clock frequency of 16.2 MHz (hereinafter called "FOS"). When the number of horizontal scan lines per frame is odd, the FOS is equivalent to a line offset sub-sampling (hereinafter called "LOS"), so that the FOS may be regarded as frame/line offset sub-sampling (FOS/LOS). On the other hand, a moving pixel area, also known as a moving image area, is subjected to the sequential processing of band limitation by means of a low-pass filter having a frequency at 16 MHz, conversion of the sampling frequency to 32.4 MHz and line offset sub-sampling (LOS) with a clock frequency of 16.2 MHz. A reduced signal derived from a still image area and a reduced signal derived from a moving image area are generated for each of the respective pixels of the image, and these two reduced signals are weighted in accordance with the degree of change in pixel signals between frames and then mixed.

FIG. 1 shows a transmission bandwidth of a conventional MUSE system, wherein the abscissa represents the spatial frequency of a present image in the horizontal direction in units of the sampling frequency (MHz), while the ordinate represents the spatial frequency of the present image in the vertical direction in units of the number of c/ph (cycles/picture height) of horizontal scan lines in one frame as a unit. The sampling frequency in the horizontal direction in terms of MHz is the same as Msps (samples per second) which indicates the number of samples taken in the horizontal direction per second. The spatial frequency in the vertical direction may also be represented as a TV number, wherein 1 cycle per picture height is twice the TV number (i.e. 1 [c/ph]=2 [TV number]). Since one frame of a high definition signal includes 1,125 horizontal scan lines, an input MUSE signal has a sampling frequency of 48.5 MHz, and the field frequency of the high definition signal is set at 60 Hz. According to the Nyquist theorem, the upper limits of the transmission band in the vertical direction, the horizontal direction and the time direction are respectively 1125/2 cycles per picture height, 24.3 MHz and 30 Hz.

In FIG. 1, a substantially triangular area below line 1 indicates the transmission band of a still image area and a triangular area below line 2 indicates a transmission band of a moving image, wherein the resolution in an oblique direction in the still image area and the moving image area is reduced by a factor of 2 due to offset sub-sampling. Since one image is formed of 2 frames in the still image area 1 while one image is formed by interpolation in one field in the moving image area 2, maximum values of the frequencies (temporal frequencies) of the image movement in the time direction with which the image can be transmitted without distortion are ¼ of the frame frequency (or 7.5 Hz) in the transmission band 1 of the still image area and ½ of the field frequency (or 30 Hz) in the transmission band 2 of the moving image area, respectively. However, in a horizontal frequency band below 4 MHz in the transmission band 1 of the still image area, the maximum value of the temporal frequency is 15 Hz since aliasing distortion due to the FOS is not produced.

In the conventional MUSE system as described above, an area in which the temporal frequency of movement is below 7.5 Hz is processed as a still image area, which leads to presenting good resolution in the horizontal, vertical and oblique directions. In contrast, an area in which the temporal frequency of movement exceeds 7.5 Hz is processed as a moving image area. However, since the transmission band 2 of the moving image area is limited, particularly in the oblique direction, the image of a slash having a relatively small pitch (for example, approximately 4√2 or 6 in the horizontal scan line number), when vibrating at a frequency above 7.5 Hz, becomes dim.

Also, the resolution of the still image area and the moving image area in the oblique direction is sacrificed when performing band compression in the MUSE system as shown in FIG. 1, because of the fact that the resolution of the human eye is generally low in oblique directions. However, dim images in oblique directions may be observed, such as the above-mentioned slash.

OBJECTS AND SUMMARY OF THE INVENTION

Accordingly, it is an object of the present invention to provide an improved image signal transmission system which avoids the aforenoted shortcomings and disadvantages encountered in the prior art.

More specifically, it is an object of the present invention to improve dim images in oblique directions in an area where the temporal frequency of movement exceeds the maximum frequency (e.g. 7.5 Hz) of the still image area.

As an aspect of the present invention, an image signal transmitting system is comprised of a first field offset sub-sampling circuit for processing a first image signal as a still image, the first image signal being in a lower region of temporal motion frequency in a frequency band, a frame/line offset sub-sampling circuit for processing the first image signal, a line offset sub-sampling circuit for processing a second image signal as a moving image, the second image signal being in a higher region of temporal motion frequency in the frequency band, a second field offset sub-sampling circuit for processing a third image signal, the third image signal being in a middle region of temporal motion frequency between the lower temporal frequency region and the higher temporal frequency region in the frequency band wherein the third image signal is sub-sampled only by the second field offset sub-sampling circuit, and each of the sub-sampling circuits has the same sampling points for the first, second and third image signals.

The above and other objects, features, and advantages of the present invention will become apparent from the following detailed description of an illustrative embodiment thereof to be read in conjunction with the accompanying drawings, in which like reference numerals represent the same or similar parts in the several views.

BRIEF DESCRIPTION OF THE DRAWINGS

FIGS. 8A to 8E are diagrams respectively showing the flow of changes in the sampling pattern of a middle image signal;

DETAILED DESCRIPTION OF THE PREFERRED EMBODIMENT

One embodiment of the present invention will hereinafter be described with reference to FIGS. 2 to 15. The present embodiment is based on the aforedescribed MUSE system for compressing the band width of a high definition television signal to 8.1 MHz for transmission. Sampling frequencies employed in this embodiment include 48.6 MHz, 24.3 MHz, 32.4 MHz, 16.2 MHz and so on. However, they will be simply referred to as 48 MHz, 32 MHz, 16 MHz and so on, for convenience.

Figure 1:
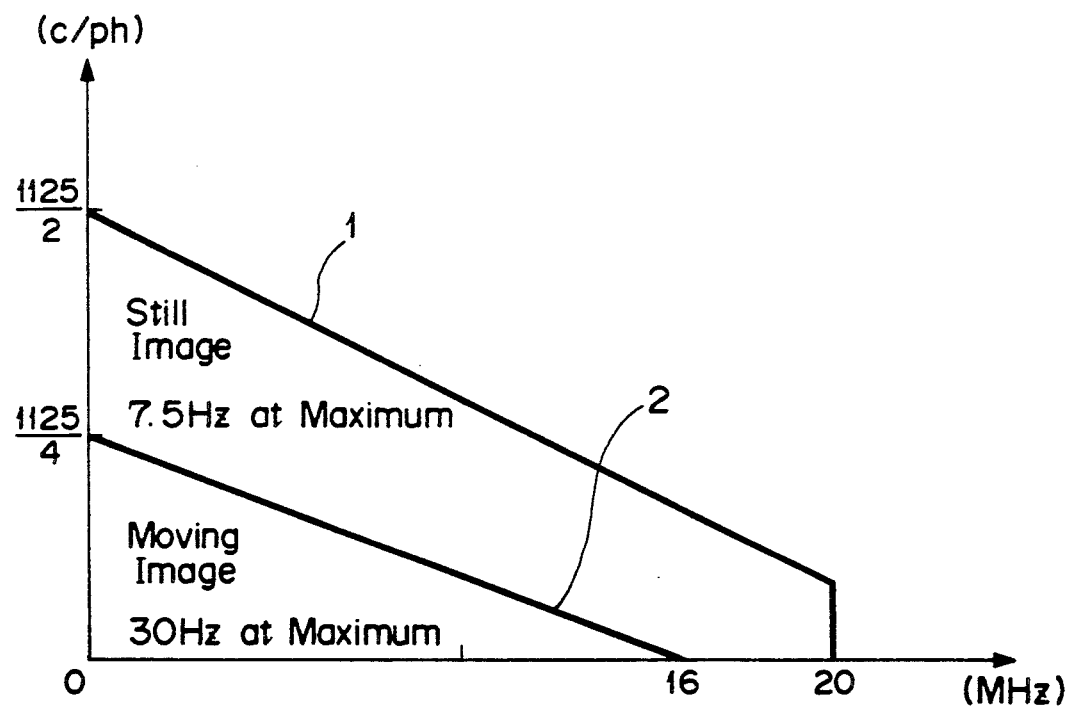
FIG. 1 is a graph showing the transmission band in the conventional MUSE system.
Figure 2B:
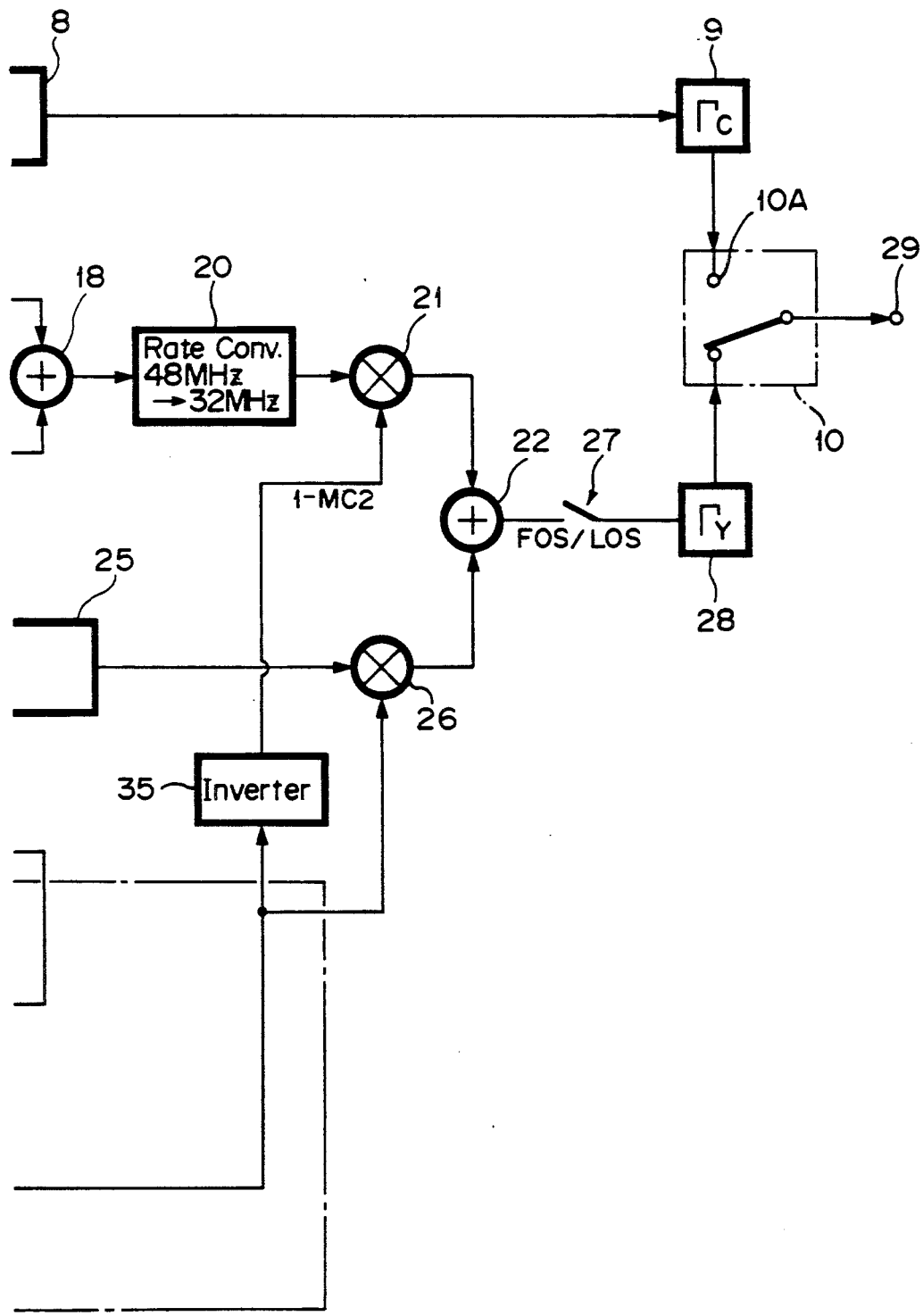
FIG. 2 (formed of FIGS. 2A and 2B drawn on two separate sheets of drawings so as to permit the use of a suitable large scale) is a circuit block diagram showing an encoder employed in an embodiment of the present invention.

FIG. 2 shows an embodiment of the encoder according to the present invention, wherein three primary color high definition signals R, G, B of a base band are supplied respectively through input terminals 4A, 4B, 4C to an input circuit 5 comprising a low pass filter circuit, an analog-to-digital (A/D) converter, an inverse gamma correction circuit, a matrix circuit and so on, typically provided in a front-end circuit. Input circuit 5 produces a luminance signal Y and color difference signals R−Y, B−Y at a sampling rate of 48.6 MHz. The color difference signals R−Y, B−Y are subjected to line sequential processing and still/moving image adaptation processing by a color signal processor 6 in a well-known manner. The processed color difference signals are then subjected to frame/line offset sub-sampling (FOS/LOS) processing in a reduction processor 7. Then, the output signal from the reduction processor 7 is supplied through a time base compressor 8 for compressing its time base by a factor of 4 and a gamma (Γc) corrector 9 for transmission to one input port 10A of a Time Compressed Integration (TCI) switching circuit 10 for time division multiplexing.

Figure 3A:
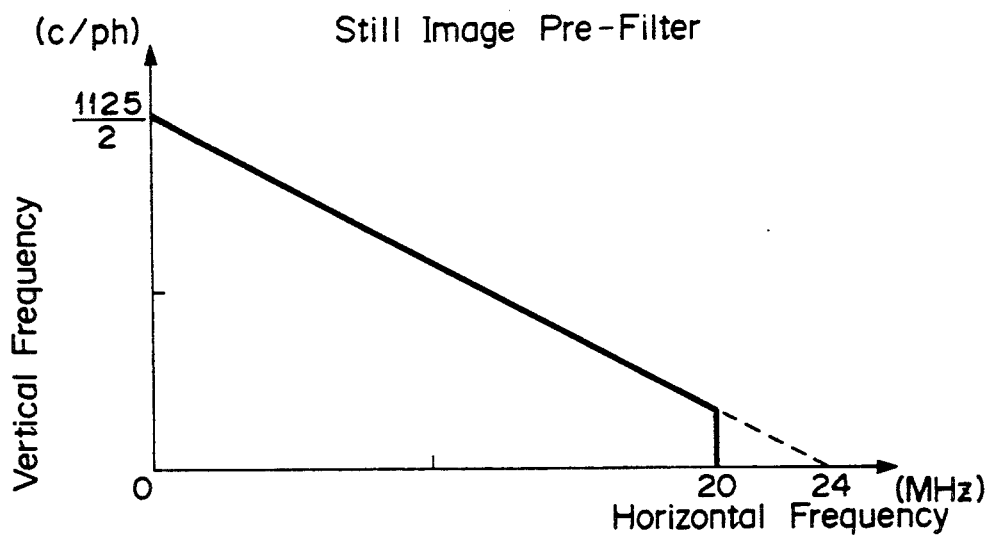
FIGS. 3A to 3C are graphs respectively showing the spatial frequency characteristics of pre-filters for still images, moving images and middle images.
Figure 3B:
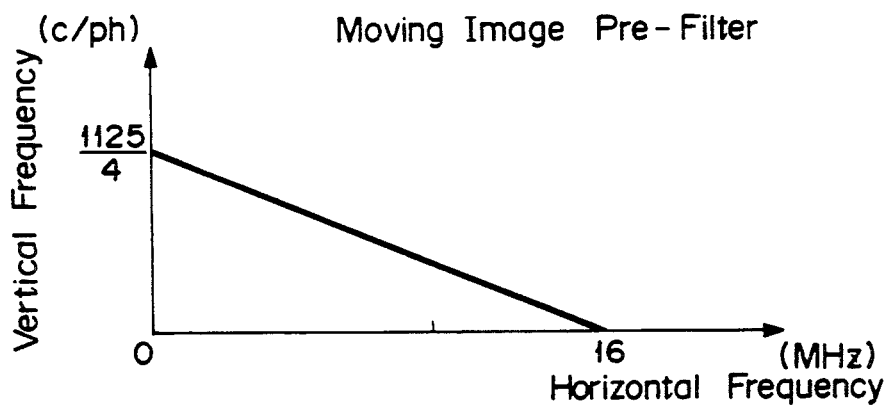
Figure 3C:
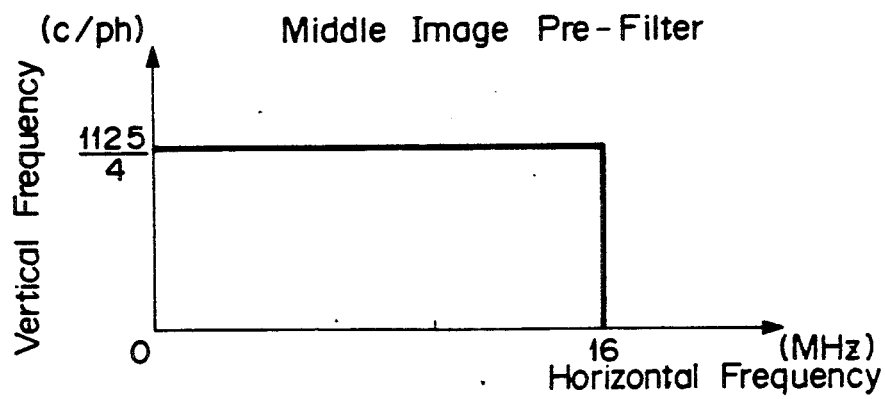

The luminance signal Y produced by input circuit 5 is applied in common to pre-filter circuits 11, 12 and 13 respectively for a still image, a moving image and a middle image. These pre-filter circuits are provided with low-pass type spatial frequency characteristics as shown in FIGS. 3A, 3B and 3C. In each of these graphical representations, the abscissa is in terms of frequency [MHz] and the ordinate is in terms of cycles per picture height [c/ph]. As shown, the still image pre-filter 11 has spatial frequency components only in an area bounded by the line connecting the point (24 MHz, 0) to the point (0, 1125/2c/ph) (FIG. 3A) with a maximum frequency of 20 MHz. The moving image pre-filter 12 has spatial frequency components only in an area, as shown in FIG. 3B, defined by the line connecting the point (16 MHz, 0) and the point (0, 1125/4c/ph). The middle image pre-filter 13 has spatial frequency components only in a rectangular area, as shown in FIG. 3C, bounded by the horizontal line of value 1125/4 c/ph with a maximum frequency of 16 MHz.

In FIG. 2, reference numeral 14 generally designates a motion area detecting circuit which receives the luminance signal Y produced by input circuit 5. A signal from the still image pre-filter 11 is subjected to field offset sub-sampling (VOS) at a sampling frequency of 24 MHz in a reduction processor 15 and thereafter is supplied through a 12 MHz low pass filter 16 for signal interpolation to one input port of a multiplier 17 which in turn supplies its output to one input port of an adder 18. Also, a signal form the moving image pre-filter 12 is supplied to one input port of a multiplier 19, the output signal of which is supplied to the other input port of the adder 18. The output signal from the adder 18 is supplied through a rate converter 20, which functions to convert the sampling frequency from 48 MHz to 32 MHz, to one input port of a multiplier 21 the output signal of which is coupled to one input port of an adder 22.

A signal from the pre-filter 13 for middle images is supplied to one input port of a multiplier 26 through a rate converter 23, which functions to convert the sampling frequency of the filtered luminance signal from 48 MHz to 32 MHz, a reduction processor 24 for performing VOS at a sampling frequency of 16 MHz, and an 8 MHz low pass filter 25. The output signal from multiplier 26 is supplied to the other input port of the adder 22, whose output, in turn, is coupled to the other input port of the TCI switching circuit 10 through a reduction processor 27 for performing frame/line offset sub-sampling (FOS/LOS) at a sampling frequency of 16 MHz and a gamma ($\Gamma v$) corrector 28, for time division multiplexing. A signal produced at the output port of the switching circuit 10 is supplied to an output circuit which includes an FM demodulating circuit or the like, not shown, through a connecting terminal 29.

Figure 4:
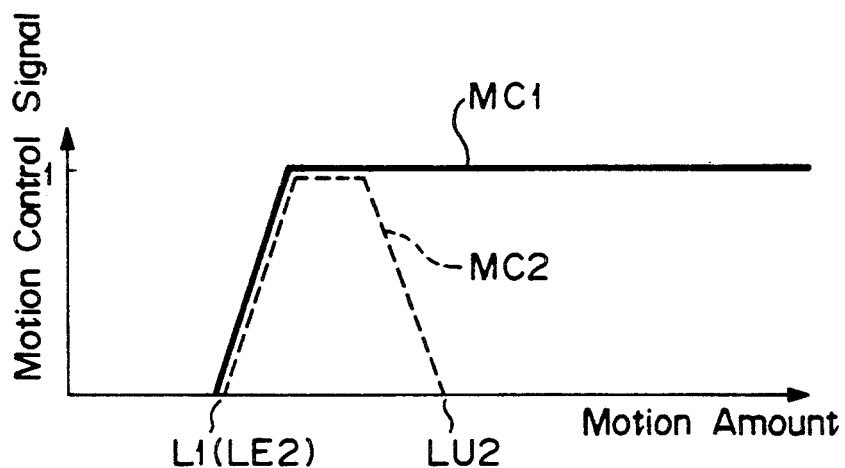
FIG. 4 is a graph showing characteristics of a motion area detecting circuit.

The area detecting circuit 14 includes a frame memory 30 and a subtracter 31. The luminance signal Y from the input circuit 5 is supplied through the frame memory 30 to a positive input of subtracter 31 and also is supplied directly to a negative input of the subtracter. In the original high definition signal, plural signals represent the same sampling point in a frame, so that the output signal of the subtracter 31 is a signal which represents the degree of movement of each pixel in an original image. Reference numerals 32 and 33 designate level detectors. The level detector 32 is provided with the output signal from the subtracter 31 and a reference signal L1 having a positive value. The level detector 33 also is supplied with the output signal from the subtracter 31 and with reference signals LU2 and LE2, each having a positive value. In the present embodiment, the values of signals L1, LE2 and LU2 satisfy the condition $L1=LE2<LU2$, as shown in FIG. 4, wherein the frequency of movement in the time direction (temporal frequency) corresponding to the signal L1 (or LE2) is selected to be 7.5 Hz, while the frequency of movement in the time direction corresponding to the signal LU2 is selected to be 15 Hz. The level detector 32, in response to an absolute value of the output from the subtracter 31 which varies from 0 through the value of the signal L1 to a value larger than L1, generates a 4-bit movement control signal MC1 varying from 0 to 1, as shown in FIG. 4. This signal MC1 is supplied to the other input port of the multiplier 19 and, through an inverter 34 which produces the movement control signal "1-MC1", to the other input port of the multiplier 17.

The level detector 33, in response to an absolute value of the output from the subtracter 31 which varies from 0 through the value of the signal LE2 to a value larger than LE2, generates a 4-bit movement control signal MC2 varying from 0 through 1 to 0, as shown in FIG. 4 This signal MC2 is supplied to the other input port of the multiplier 26 and, through an inverter 35 which produces the movement control signal "1-MC2", to the other input port of the multiplier 21.

Figure 5:
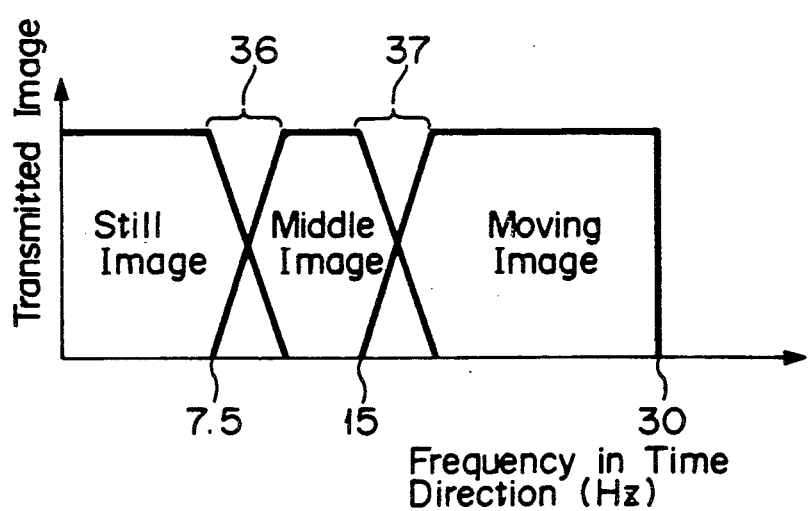
FIG. 5 is a graph used for explaining the operation of the motion area detecting circuit.

FIG. 5 is a graphical representation of the frequency in the time direction of pixel motion in an original image to be transmitted. It is seen that signals (still image signals) filtered by the still image pre-filter block 11 are transmitted in a frequency range from 0 to 7.5 Hz, signals (middle image signals) principally filtered by the middle image pre-filter block 13 are transmitted in a frequency range from 7.5 to 15 Hz, and signals (moving image signals) filtered by the moving image pre-filter block 12 are transmitted in a frequency range from 15 to 30 Hz. Let it be assumed that region 36 occupies a predetermined width, for example, 3 Hz from the frequency 7.5 Hz and that region 37 occupies a predetermined width from the frequency 15 Hz. Still image signals and middle image signals are mixed with a particular weight and transmitted in the region 36, while middle image signals and moving image signals are mixed with a particular weight and transmitted in the region 37.

Figure 6A:
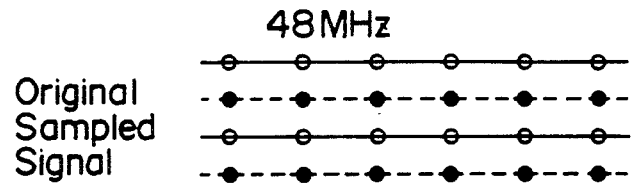
FIGS. 6A to 6E are diagrams respectively showing the flow of changes in the sampling pattern of a still image signal processed by the encoder shown in FIG. 2.
Figure 6B:
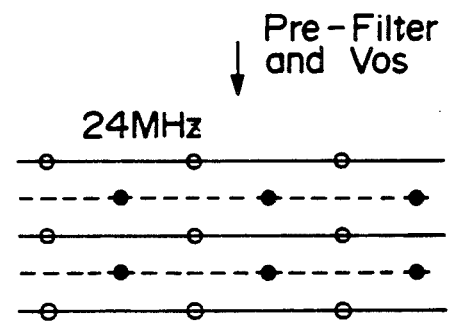
Figure 6C:
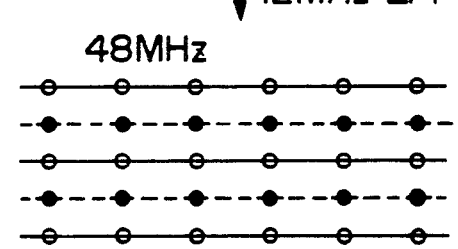
Figure 6D:
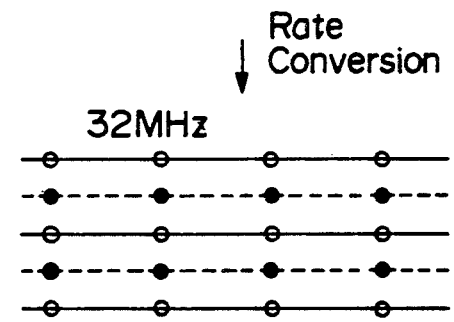
Figure 6E:
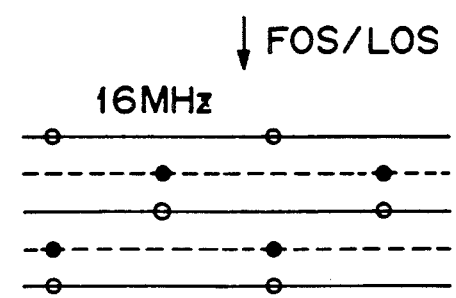

Now, explaining how the embodiment of FIG. 2 effects changes in the sampling pattern of a still image signal, the sampling points of a currently sampled signal (luminance signal Y) of the current field and the previous field produced by input circuit 5 are represented as solid circles and open circles, respectively, as shown in FIG. 6A. The sampling pattern at this time is a square lattice with a sampling rate of 48 MHz in the horizontal direction and 1125c/ph in the vertical direction. The sampling pattern of this currently sampled signal after passing through the still image pre-filter 11 and the reduction processor 15 for performing VOS is a rhombic pattern with a sampling rate of 24 MHz in the horizontal direction as shown in FIG. 6B. Subsequently, the sampling pattern of the currently sampled signal, after signal interpolation by the 12-MHz low pass filter 16, appears as a square lattice with a sampling rate of 48 MHz in the horizontal direction as shown in FIG. 6C. Then, after rate conversion by the rate converter 20, the sampling pattern appears as a square lattice with a sampling rate of 32 MHz in the horizontal direction as shown in FIG. 6D. Finally, after passing the currently sampled signal through the reduction processor 27 for performing frame/line offset sub-sampling FOS/LOS, the sampling pattern appears as a hexagonal lattice with a sampling rate of 16 MHz in the horizontal direction as shown in FIG. 6E.

Figure 7A:
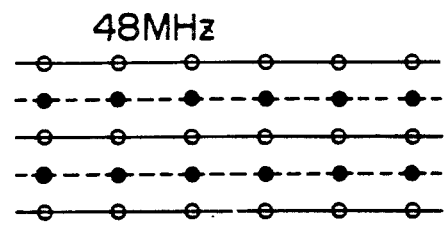
FIGS. 7A to 7D are diagrams respectively showing the flow of changes in the sampling pattern of a moving image signal.
Figure 7B:
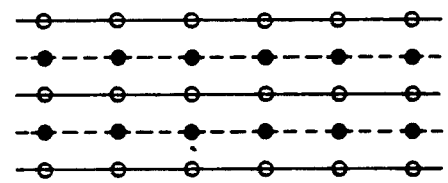
Figure 7C:
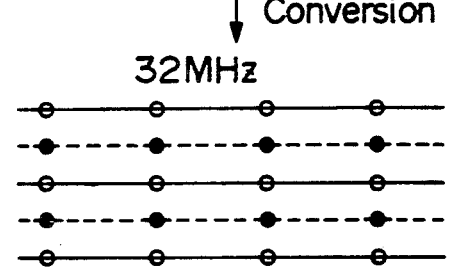
Figure 7D:
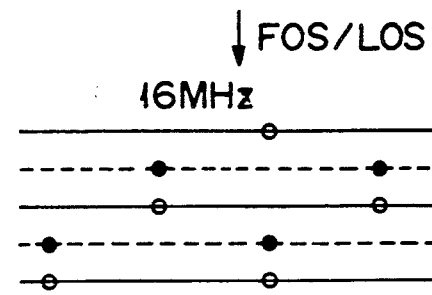

In a similar manner, the sampling pattern of a moving image signal, which is the output signal from the moving image pre-filter 12, is shown in FIG. 7B to be the same square lattice as the sampling pattern of the original signal shown in FIG. 7A. This square lattice pattern of FIG. 7B is rate-converted to a square lattice with a sampling rate of 32 MHz in the horizontal direction, as shown in FIG. 7C. It is further converted to a hexagonal lattice with a sampling rate of 16 MHz in the horizontal direction by FOS/LOS as shown in FIG. 7D.

The sampling pattern of a middle image signal, which is the output signal from the middle image pre-filter 13, exhibits the same pattern as that of the original signal to be sampled, as shown in FIG. 8A. After the middle image signal passes through the rate converter 23, the pattern is converted to a square lattice with a sampling rate of 32 MHz in the horizontal direction as shown in FIG. 8B. Then, after performing VOS by the reduction processor 24, the pattern of the middle image signal appears as a rhombic lattice with a sampling rate of 16 MHz in the horizontal direction as shown in FIG. 8C. Following interpolation by means of the 8-MHz low pass filter 25, the pattern appears as a square lattice with a sampling rate of 32 MHz in the horizontal direction as shown in FIG. 8D. The final sampling pattern derived from FOS/LOS performed by the reduction processor 27 appears as a hexagonal lattice with a sampling rate of 16 MHz in the horizontal direction as shown in FIG. 8E. It will be understood that in the present embodiment the sampling patterns (that is, the transmission sampling points) of the middle image signal at the final transmission stage (i.e. at reduction processor 27) have sampling points that are the same sampling points as the still image signal and the moving image signal.

Since the spatial frequency structure of the still image signal and the moving image signal in FIG. 2 is well known, an explanation thereof will be omitted. However, the spatial frequency structure of the middle image signal will be explained with reference to FIGS. 9A to 9D.

Figure 9A:
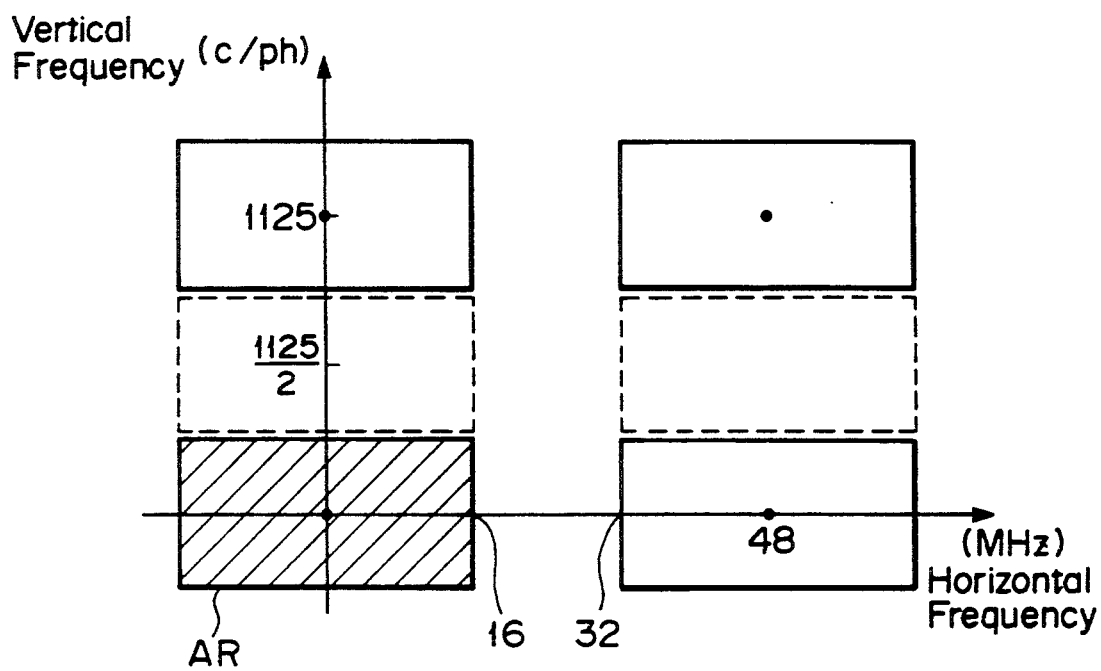
FIGS. 9A to 9D are diagrams respectively showing changes in the spatial frequency structure of the middle image signal shown in FIG. 8.
Figure 9B:
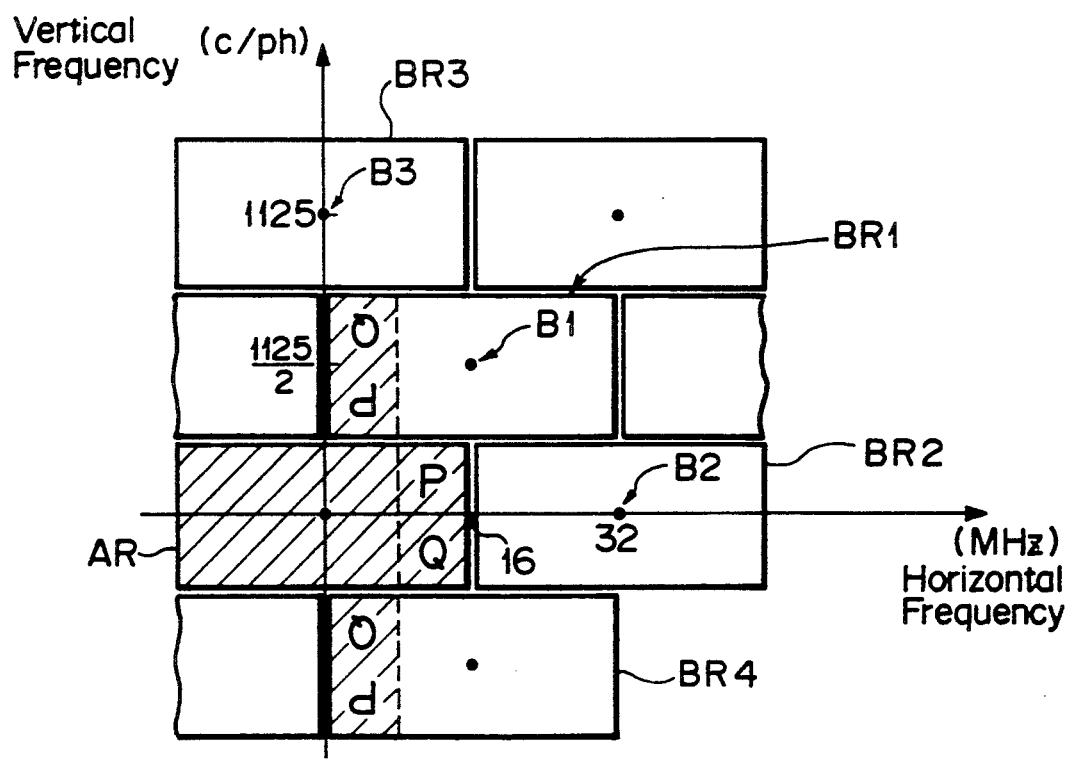

Assuming that in FIGS. 9A to 9D the abscissa represents the horizontal frequency (MHz) and the ordinate represents the vertical frequency (c/ph) Since the middle image pre-filter 13 has characteristics as shown in FIG. 3C, spatial frequency components of the filtered middle image signal are generated in a hatched area AR with the origin as the center of this area, as shown in FIG. 9A. This area AR is bounded by the horizontal frequencies ±16 MHz and the vertical frequencies ±1125/4c/ph. From the previous discussion it is seen that the Fourier transformed image of the sampling pattern of the currently sampled signal is a square lattice wherein the frequency interval in the horizontal direction is 48 MHz and the frequency interval in the vertical direction is 1125c/ph (shown by solid circles in FIG. 9A). Hence, the structure of the spatial frequency component across the entire frequency is a pattern which may be obtained by folding back the area AR. The areas surrounded by broken lines in FIG. 9A represent signals which are inverted between fields and disappear by field interpolation, and therefore illustration of these areas will be hereinafter omitted.

After performing VOS, the Fourier transformed image of the sampling pattern with the sampling rate of 16 MHz shown in FIG. 8C is a rhombic lattice (represented by solid circles in FIG. 9B) wherein the coordinates of the solid circuit B1 located at the shortest distance from the origin are (16 Mhz, 1125/2c/ph). Therefore, a non-zero spatial frequency component area of a signal generated by performing VOS for the middle image signal shown in FIG. 8C becomes areas BR1, BR2, BR3, . . . which are obtained by folding back or moving the area AR about respective solid circles B1, B2, B3, . . . , except for the origin as the center. For example, a sub-area in the area AR from 8 to 16 MHz in the horizontal direction is folded back to a sub-area from 0 to 8 MHz in the horizontal direction in the area BR1 having the solid circle B1 as its center. The sub-area in the area AR from 8 to 16 MHz in the horizontal direction is also folded back to a sub-area from 0 to 8 MHz in the horizontal direction in the area BR4 whose ordinate is in the negative direction, and so on.

Figure 9C:
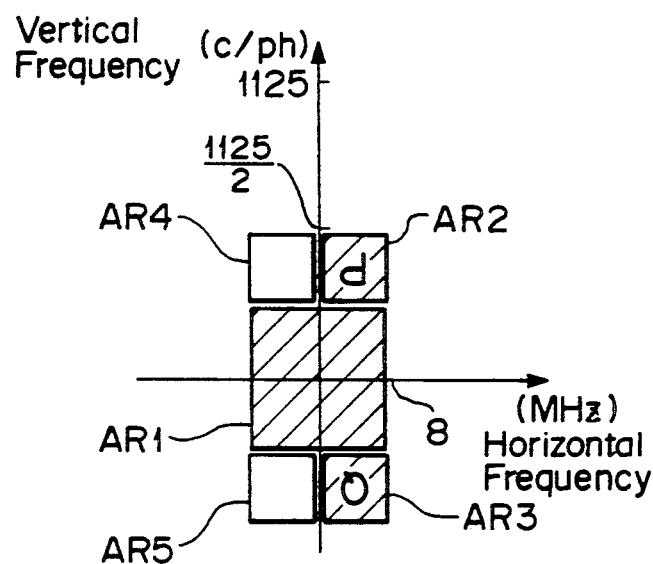

A basic component area where non-zero frequency components of the signal (shown in FIG. 8D) derived by interpolating the signal shown in FIG. 8C by means of the 8-MHz low pass filter 25 is, as shown in FIG. 9C, comprised of an area AR1 having a width of 16 MHz and a height of 1125/2c/ph and areas AR2-AR5, each having a width of 8 MHz and a height of 1125/4c/ph. By folding back the areas AR2 and AR3 on the right side of the area AR! and also folding back the areas AR4 and AR5 on the left side of the area AR1, the area AR (see FIG. 9A) is reproduced where the original spatial frequency of the middle image signal is not zero.

Figure 9D:
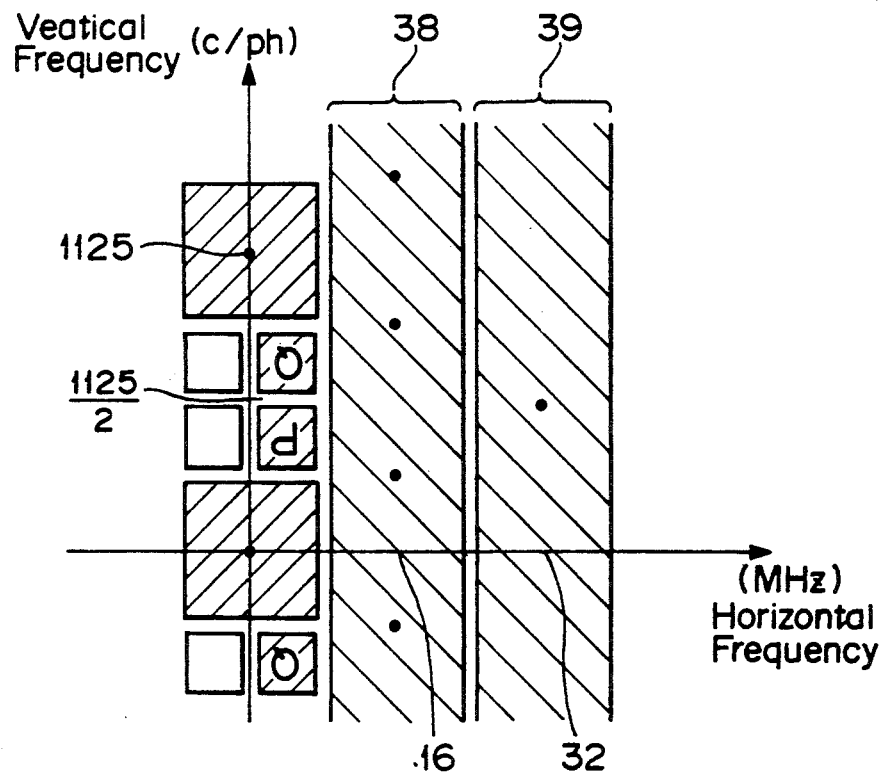

The Fourier transformed image of the hexagonal lattice with a horizontal frequency of 16 MHz (the sub-sampling pattern derived by FOS/LOS) shown in FIG. 8E is represented by solid circles shown in FIG. 9D, as will be later referred to. Since the horizontal interval of the Fourier transformed image is 16 MHz, and the area shown in FIG. 9C which serves as a basic unit also has a width of 16 MHz, the spatial frequency of the middle image signal, when output from the reduction processor 27 (the pattern shown in FIG. 8E), is as shown in FIG. 9D. Here, a pattern provided by folding or moving in parallel the basic components shown in FIG. 9C is formed solely in areas 38, 39, . . . , which leads to the generation of no aliasing distortion in the basic component area including the origin. It is therefore possible to regard the FOS/LOS performed by the reduction processor 27 as a mere sampling which satisfies the Nyquist condition for the middle image signal. For this reason, the middle image signal will not be distorted even if transmission sampling points of the middle image signal are set at the same points as those of still image signals and moving image signals.

Figure 10:
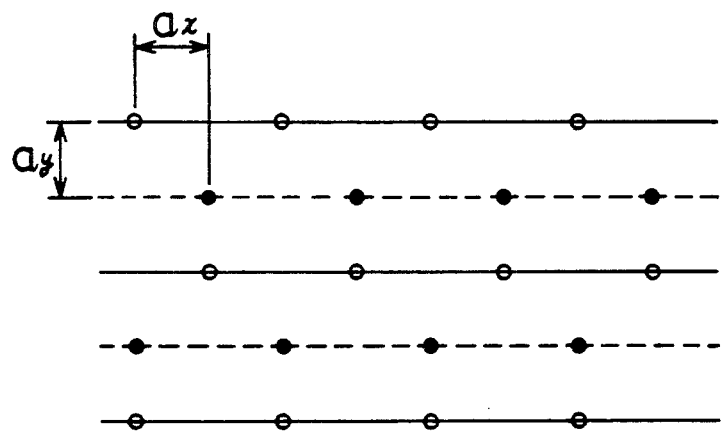
FIG. 10 is a diagram showing a sampling pattern of a frame/line offset sub-sampling.
Figure 11A:
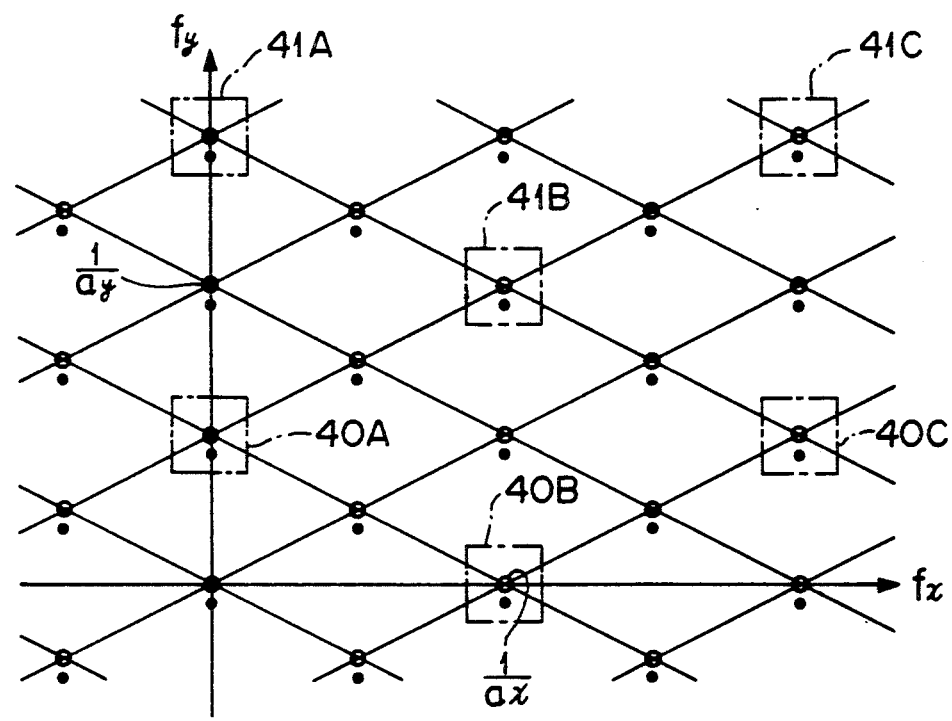
FIGS. 11A and 11B are graphs respectively showing Fourier transformed images of the sampling pattern illustrated in FIG. 10.
Figure 11B:
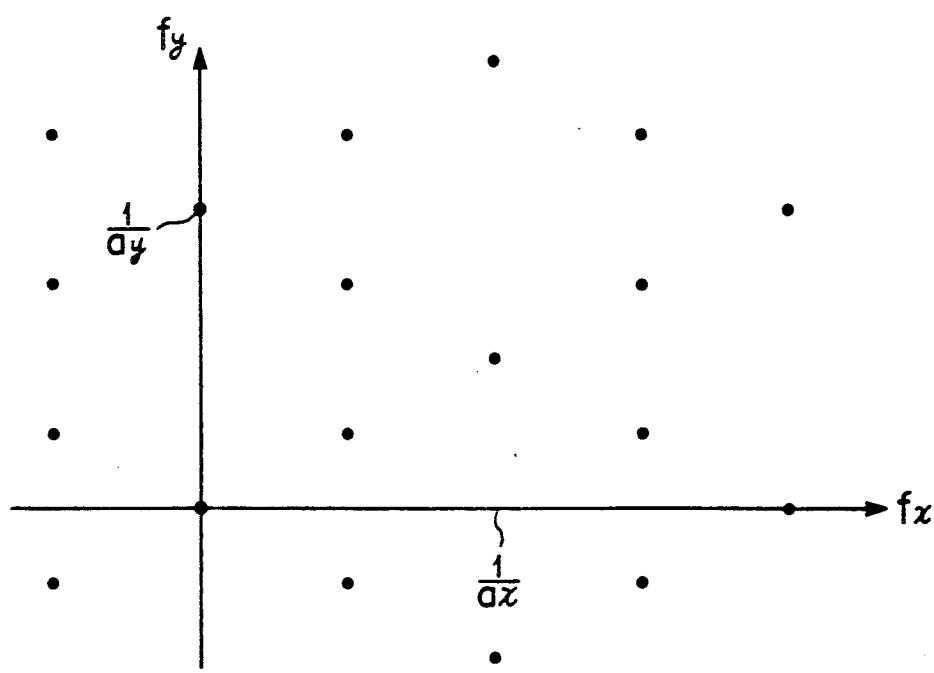

Next, the Fourier transformed image of the sampling pattern derived by the FOS/LOS will be explained with reference to FIG. 10 where a minimum interval in the horizontal direction (x-direction) of the hexagonal lattice sampling pattern derived by the FOS/LOS is represented by $a_x$, and a minimum interval in the vertical direction (y-direction) is represented by $a_y$. Considering the hexagonal lattice as being separated into a rhombic lattice formed of solid circles and a rhombic lattice formed of open circles, the Fourier transformed images of the respective rhombic lattices are themselves rhombic lattices comprised of the same pattern formed of solid circles and open circles as shown in FIG. 11A, as is well known in the art. The lengths of the diagonals in the direction of the abscissa $f_x$ (the spatial frequency in the horizontal direction) and in the direction of the ordinate $f_y$ (the spatial frequency in the vertical direction) are respectively given by $1/a_x$ and $1/(2a_y)$. However, in FIG. 10 the rhombic lattice formed of solid circles is such that the rhombic lattice formed of open circles is moved by $a_y$ in the vertical direction, so that the phase of the Fourier transformed image of the rhombic lattice formed of the solid circles at a spatial frequency coordinate (fx, fy) advances by $\Delta\phi$ with respect to the phase of the rhombic lattice formed of the open circles wherein:

$$\Delta\phi = 2\pi f_y a_y \qquad (1)$$

Therefore, in a portion where $\Delta\phi = (2n+1)\pi$ or $$f_y = (n + \tfrac{1}{2})/a_y \qquad (2).$$

the phases of both Fourier transformed images differ from each other by $\pi$ to present inverse phases. Thus, in positions 40A, 40B, ..., 41A, 41B, ... in FIG. 11A where the above equation (2) applies, the spatial frequency is zero. Therefore, the Fourier transformed image of the entire sampling pattern shown in FIG. 10 becomes as shown in FIG. 11A, where a collection of solid circles shown in FIG. 9D is derived by replacing $1/a_y$, with $1125c/ph$ ($1/a_y = 1125c/ph$) and $1/a_x$ with 32 MHz ($1/a_x = 32$ MHz).

As described above, according to the encoder shown in FIG. 2, the temporal frequency range of motion of the luminance signal output from input circuit 5 in an area of an original image to be transmitted which occupies from 0 to 7.5 Hz, from 7.5 to 15 Hz or from 15 to 30 Hz, signals filtered by the still image pre-filter 11, the moving image pre-filter 12 and the middle image pre-filter 13 are bandwidth compressed and supplied to an output circuit, not shown, through the TCI switching circuit 10. In the horizontal blanking period of the luminance signal Y, bandwidth compressed and time compressed color difference signals are supplied to the output circuit, not shown, through the TCI switching circuit 10 by changing over the schematically depicted movable contact of the TCI switching circuit 10 to the fixed contact 10A coupled to the gamma corrector 9.

Figure 12:
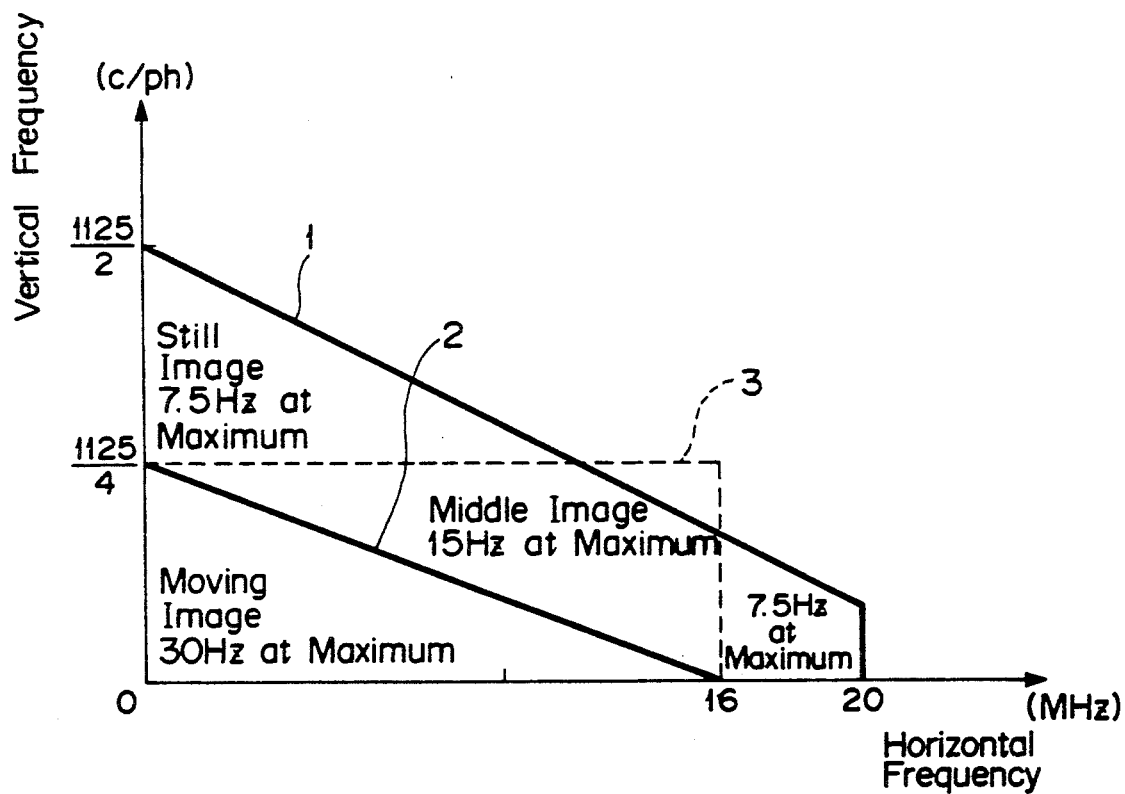
FIG. 12 is a graph showing the transmission band of the encoder of FIG. 2.

As shown in the spatial frequency graph of FIG. 12, the transmission bands of signals in the still image area with temporal frequencies from 0 to 7.5 Hz, signals in the middle image area with temporal frequencies from 7.5 to 15 Hz, and signals in the moving image area with temporal frequencies from 15 to 30 Hz are represented by a substantially triangular area 1, a rectangular area 3 and a triangular area 2, respectively. In this drawing, since the resolution of rectangular area 3 (in an oblique direction) is improved on the order of twice that of the triangular area 2, the present embodiment is advantageous in reducing dim images in the oblique direction of the middle image area where images are moving a bit faster than those in the still image area. More specifically, a slash formed of substantially $4/\sqrt{2}$ horizontal scan lines or with a pitch of approximately 3 lines, even when vibrating at temporal frequencies ranging from 7.5 to 15 Hz, will not become dim.

Further in the present embodiment, the transmission sampling points of the still image area, the middle image area and the moving image area, which constitute the respective sampling patterns output from the TCI switching circuit 10, are set at the same positions so that even if motion detection is erroneously performed by the decoder, for example, even if an image to be processed as belonging to the middle image area actually is processed as an image in the still image area, the quality of the reproduced image is not largely deteriorated.

Figure 13A:
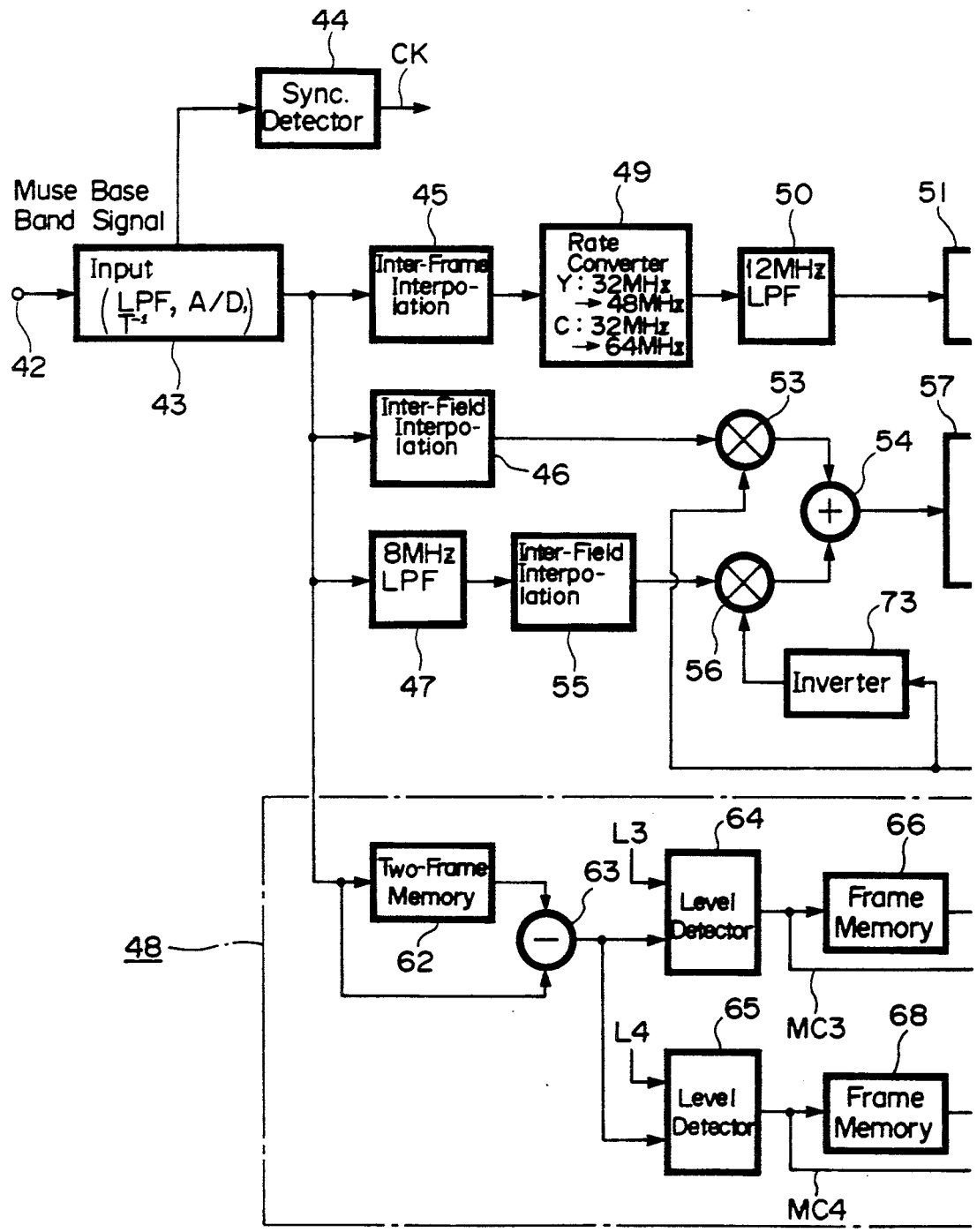
FIG. 13 (formed of FIGS. 13A and 13B drawn on two separate sheets of drawings so as to permit the use of a suitable large scale) is a circuit block diagram showing a decoder employed in the embodiment of the present invention.
Figure 13B:
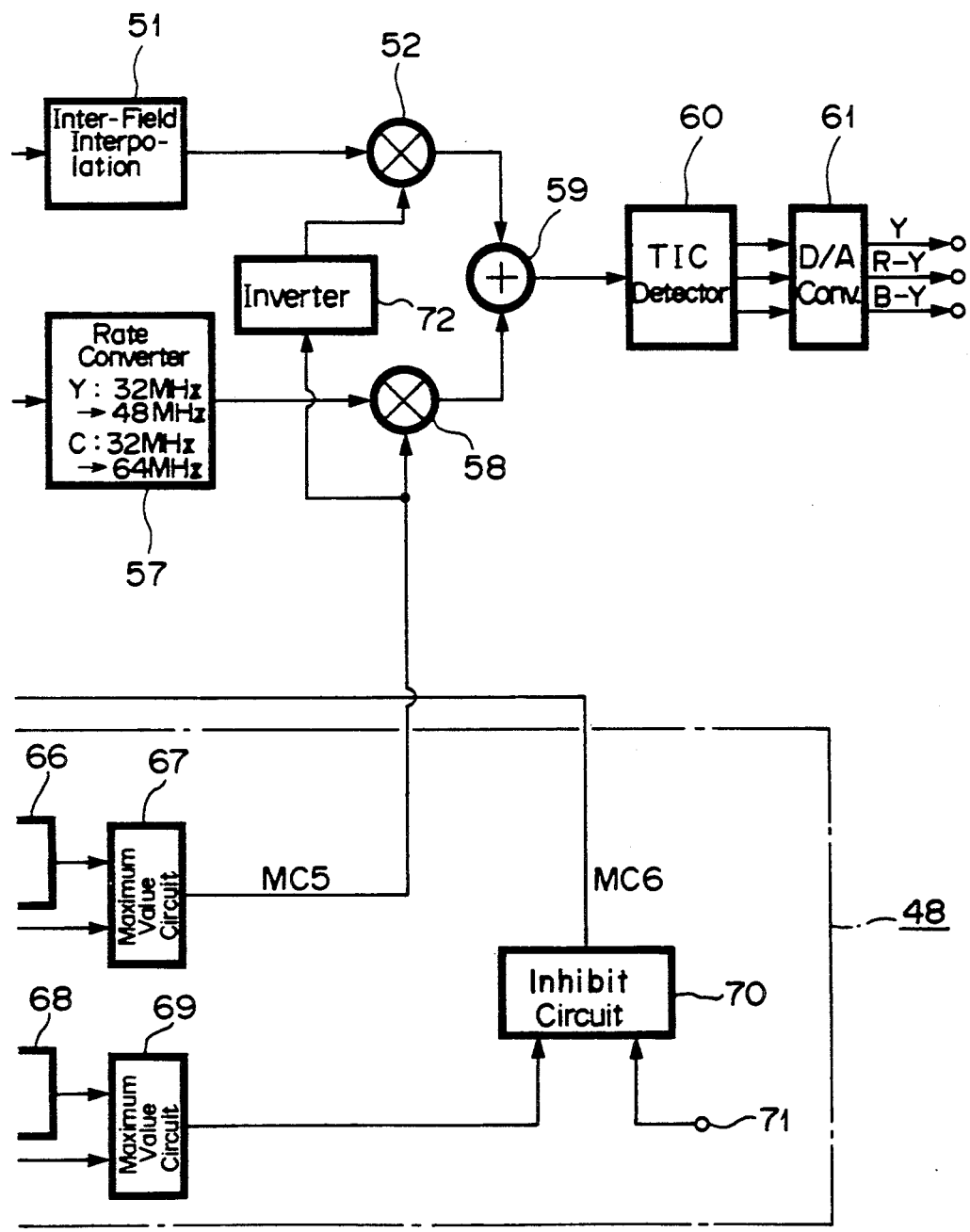

Next, an embodiment of a decoder according to the present invention will be explained with reference to FIG. 13. In FIG. 13, reference numeral 42 designates an input terminal and 43 an input circuit including a low pass filter circuit, an analog-to-digital (A/D) converter with a sampling frequency at 16 MHz, an inverse gamma correction circuit for the transmission path and so on. Base band signals in the MUSE system outputted from, for example, a satellite broadcasting (BS) tuner, not shown, are supplied to the input circuit 43 through the input terminal 42. In the present embodiment, a video signal which is bandwidth compressed by the encoder shown in FIG. 2 is referred to as a base band signal in accordance with the MUSE system. Reference numeral 44 designates a synchronizing signal detecting circuit for reproducing a clock pulse CK from the base band signal and for use in A/D conversion and so on.

Reference numeral 45 designates an inter-frame interpolator for deriving one frame portion of a still image signal with a sampling frequency at 32 MHz by interpolating data in two frames, 46 an intra-field interpolator for deriving one field portion of a moving image signal with a sampling frequency at 32 MHz by interpolating one field portion of data, 47 an 8-MHz low pass filter for exclusively filtering basic components of the middle image signal shown in FIG. 9C which includes horizontal frequencies below 8 MHz, and 48 designates a motion area detecting circuit.

Video signals from the input circuit 43 are supplied in common to the interpolators 45, 46 and the low pass filter 47 as well as to the motion area detecting circuit 48. The sampling frequencies of a luminance signal Y and a chroma signal C in the output signal produced by the inter-frame interpolator 45 are converted to be 48 MHz and 64 MHz, respectively by a rate converter 49. The signals, after the rate conversion, are supplied to one input port of a multiplier 52 through a 12-MHz low pass filter 50 and an inter-field interpolator 51, and the output signal from this multiplier 52 is supplied to one input port of an adder 59. The inter-field interpolator 51 restores one frame portion of a still image signal by interpolating a signal derived by VOS for returning the sampling pattern shown in FIG. 6C to the sampling pattern shown in FIG. 6B by means of a filter having characteristics equal to the characteristics shown in FIG. 3A for the pre-filter for still image signals.

The intra-field interpolator 46 has filter characteristics identical to the characteristics shown in FIG. 3B for the pre-filter for moving image signals, and a moving image signal reproduced by this intra-field interpolator is supplied to one input port of a multiplier 53, the output of which is coupled to an input port of adder 54.

A signal whose basic components are comprised of frequency components of the middle image signal shown in FIG. 9C (actually, it also has higher harmonic components in the vertical direction), filtered by the 8-MHz low pass filter 47, is supplied to an inter-field interpolator 55. Since the sampling performed for this middle image signal at the transmission stage shown in FIG. 8E is a mere sampling which satisfies the ordinary Nyquist condition, the signal supplied to the interpolator 55 can be regarded as a signal with a horizontal frequency at 32 MHz as shown in FIG. 8D. The inter-field interpolator 55 is adapted to return the signal from the pattern shown in FIG. 8D to the pattern shown in FIG. 8C (or the frequency structure is returned form the condition shown in FIG. 9C to the condition shown in FIG. 9B). The signal, after being subjected to VOS, is interpolated by a filter having the characteristics of the pre-filter for middle image signals shown in FIG. 3C to reproduce a middle image signal where the basic frequency component area is equal to the area AR shown in FIG. 9A. This middle image signal is supplied to one input port of a multiplier 56, the output signal of which is supplied to another input port of adder 54. The sampling frequencies of the luminance signal Y and the chroma signal C in the output signal of the adder 54 are converted to 48 MHz and 64 MHz, respectively, by a rate converter 57 and these signals, after rate conversion, are supplied to one input port of a multiplier 58, the output signal of which is, in turn, supplied to the other input port of the adder 59. A TCI decoder 60, which is well known in the art, performs signal processing such as time expansion or the like for the chroma signal C in the output signal from the adder 59 to thereby generate a luminance signal Y and color difference signals R−Y, B−Y. These signals Y, R−Y, B−Y are supplied through a digital-to-analog (D/A) converter 61 to a receiver, not shown.

Figure 14:
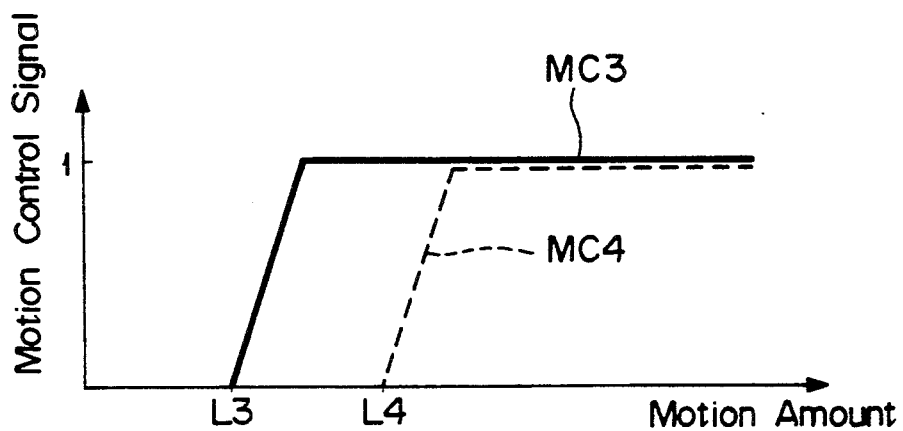
FIG. 14 is a graph used for explaining the characteristics of the motion area detecting circuit shown in FIG. 13.

In the motion area detecting circuit 48, reference numeral 62 designates a two-frame memory, and 63 designates a subtracter. A video signal output from the input circuit 43 is supplied directly to a negative input port of the subtracter 63 and through the two-frame memory 62 to a positive input of the subtracter. In the encoder shown in FIG. 2, the FOS/LOS is performed finally in the reduction processor 27 so that the same sampling point does not exist in one frame, while, between two frames, there always exists the same sampling points. Therefore, the output signal from the subtracter 63 precisely represents the motion of respective pixels constituting a transmitted image. Reference numerals 64 and 65 both designate level detectors. The level detector 64 is supplied with the output signal from the subtracter 63 and a signal L3 exhibiting a positive value, while the level detector 65 also is supplied with the output signal from the subtracter and a signal L4 which exhibits a positive value. The signals L3, L4 satisfy the relation L3<L4 as shown in FIG. 14. The temporal frequencies of motion corresponding to the signals L3, L4 are set to 7.5 Hz and 15 Hz, respectively.

The level detector 64, in response to a change in the absolute value of the output signal from the subtracter 63 from 0 through the value of the signal L3 to a value larger than L3, generates a 4-bit motion control signal MC3, the value of which varies from 0 to 1 as shown in FIG. 14. This signal MC3 is supplied directly to one input of a maximum value circuit 67 as well as through a frame memory 66 to another input of the maximum value circuit. The maximum value circuit 67 selects the signal having a larger value from the two signals supplied thereto to produce a motion control signal MC5 which is supplied to an input port of the multiplier 58 as well as to an inverter 72 to generate a movement control signal having a value of "1-MC5". This signal from inverter 72 is supplied to an input port of the multiplier 52. The maximum value circuit 67 is used to detect motion information precisely not only in the current frame but also in the previous frame since, in the still image area, one screen portion of data is reproduced from two frames of data.

The level detector 65, in response to the absolute value of the output from the subtracter 63 which varies from 0 through the value of the signal L4 to a value larger than L4, generates a 4-bit movement control signal MC4 varying from 0 to 1 which is supplied directly to one input of a maximum value circuit 69 as well as through a frame memory 68 to another input of the maximum value circuit. The maximum value circuit 69 selects the signal having a larger value from the two signals applied thereto and supplies that signal to one input port of an inhibit circuit 70. The inhibit circuit has another input port coupled to a terminal 71 to be supplied with a signal indicating whether the currently processed signal is a luminance signal Y or a chroma signal C. When the currently processed signal is the luminance signal Y, the inhibit circuit 70 passes the output signal from the maximum value circuit 69 as a motion control signal MC6. However, when the currently processed signal is the chroma signal C, the inhibit circuit 70 produces a signal having the value 1 as the motion control signal MC6. The motion control signal MC6 is supplied to an input port of the multiplier 53 and to an inverter 73 which generates a movement control signal having the value "1-MC6". The output from the inverter is supplied to an input port of the multiplier 56. Stated otherwise, in the present embodiment, when the currently processed signal is the chroma signal C, the adder 54 is supplied only with a moving image signal derived by the intra-field interpolator 45, which is based on the fact that the encoder shown in FIG. 2 has a low resolution for the chroma signal C so that the middle image signal is not generated. However, if the encoder generates the middle image signal for the chroma signal C, the inhibit circuit 70 is not necessary.

Figure 15:
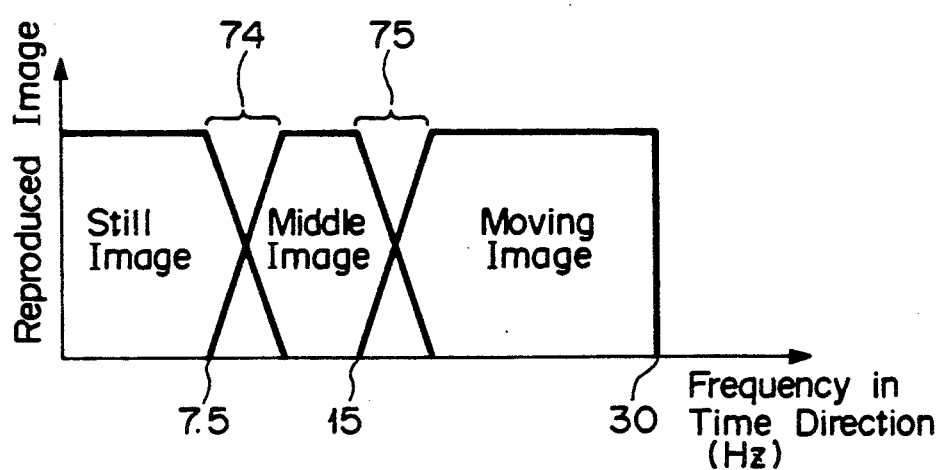
FIG. 15 is a graph used for explaining the operation of the motion area detecting circuit.

The graph shown in FIG. 15 represents the frequency in the time direction of motion (temporal frequency) of pixels in transmitted image data to be reproduced on the abscissa in the graph shown in FIG. 15. Signals (still image signals) restored by the series circuit formed of the inner-frame interpolator 45, rate converter 49, filter 50 and the inter-field interpolator 51 of FIG. 13 are supplied to the receiver in a temporal frequency range from 0 to 7.5 Hz by the action of the motion control signals MC5 and MC6, as shown in FIG. 15. Also, in the temporal frequency range from 7.5 to 15 Hz, signals (middle image signals) that are mainly restored by the inter-field interpolator 55 are supplied to the receiver except for the chroma signal C, and in the temporal frequency range from 15 to 30 Hz, signals (moving image signals) that are restored by the intra-field interpolator 46 are supplied to the receiver. Further, if a region 74 occupies a predetermined width, for example, 3 Hz from the frequency 7.5 Hz and a region 75 occupies a predetermined width from the frequency 15 Hz, still image signals and middle image signals mixed with a particular weight and transmitted to the receiver are in the region 74, while middle image signals and moving image signals mixed with a particular weight and transmitted to the receiver are in the region 75.

As described above, the decoder of the present embodiment shown in FIG. 13 detects, by the use of the motion area detecting circuit 48, the temporal frequency of the movement of pixels which are to be substantially reproduced, and circuit 48 switches the still image signal, the middle image signal and the moving image signal corresponding to the detected temporal frequency, which results in faithfully restoring these three types of signals generated by the encoder shown in FIG. 2. In this case, since the decoder is provided with the series circuit formed of the 8-MHz low pass filter 47 and the inter-field interpolator 55, the middle image signal corresponding to motion, the temporal frequency of which lies between 7.5 and 15 Hz, generated by the encoder also will be faithfully reproduced. Since the transmission band of the middle image signal in the oblique direction is improved by a factor of two in comparison with the prior art, as shown in FIG. 12, the decoder of the present embodiment advantageously reduces dim images in the oblique direction in the middle image area which are moving a bit faster than images in the still image area.

Further, the decoder shown in FIG. 13 is provided merely with the 8-MHz low pass filter 47, the inter-field interpolator 55, the level detector 65 and so on in addition to the conventional MUSE system decoder, thereby enabling the size of the circuit and the production cost thereof to be similar to the prior art.

Although FIG. 13 illustrates that the frame memory 68 is provided separately from the frame memory 66, the frame memory 68 can be deleted by interposing the frame memory 66 and the maximum value circuit 67 between the subtracter 63 and the level detectors 64, 65.

Also, in the above described embodiment, an explanation of the transmission path between the encoder and the decoder has been omitted. However, since the pattern and bandwidth (8.1 MHz) of the transmission sampling points of the base band signal of this embodiment are the same as those of the base band signal in the typical MUSE system, it will be recognized that MUSE system transmission paths, such as those used in satellite broadcasting, may be employed without modification.

According to the present invention, since video signals in a middle image area (that is, with the frequency of motion between a still image area and a moving image area) is subjected solely to field offset sub-sampling, dim images in oblique directions in the middle image area which are moving a bit faster than images in the still image area may be reduced.

Further, the transmission sampling points of the middle image area are the same as those of the still image area and the moving image area, so that even if a motion frequency is erroneously detected by the decoder, deterioration in the quality of the reproduced image is minimized.

Having described a preferred embodiment of the present invention with reference to the accompanying drawings, it is to be understood that the invention is not limited to the precise embodiment and that various changes and modifications thereof could be effected by one skilled in the art without departing form the spirit or scope of the novel concepts of the invention as defined in the appended claims.

I claim as my invention:

1. An image signal transmitting system comprising:
   input means for providing said image signal;
   first field offset sub-sampling means coupled to said input means for processing a first image signal as a still image, said first image signal being in a relatively lower region of temporal motion frequency in a frequency band;
   frame/line offset sub-sampling means coupled to said first field offset sub-sampling means for processing the first image signal processed by said first field offset sub-sampling means;
   line offset sub-sampling means coupled to said input means for processing a second image signal as a moving image, said second image signal being in a relatively higher region of temporal motion frequency in the frequency band; and
   second field offset sub-sampling means coupled to said input means for processing a third image signal, said third image signal being in a middle region of temporal motion frequency between said lower temporal frequency region and said higher temporal frequency region in the frequency band;
   wherein said third image signal is sub-sampled substantially only by said second field offset sub-sampling means, and each of said sub-sampling means has the same sampling points for said first, second and third image signals.

2. An image signal transmitting system according to claim 1, wherein said second field offset sub-sampling means is comprised of a low pass filter and frame/line offset sub-sampling means.

3. An image signal transmitting system according to claim 1, wherein the image signal has a repetitive video frame frequency and said first image signal exhibits a motion frequency lower than a quarter of said frame frequency.

4. An image signal transmitting system according to claim 1, wherein the image signal has a repetitive video field frequency and said second image signal exhibits a motion frequency between a quarter of said field frequency and a half of said field frequency.

5. An image signal transmitting system according to claim 1, wherein the image signal has repetitive video frame and field frequencies and said third image signal exhibits a motion frequency between a quarter of said frame frequency and a quarter of said field frequency.

6. An image signal transmitting system according to claim 1, wherein said input means includes prefilter means having predetermined spatial frequency characteristics to filter the image signal into said still, moving and middle image regions.

7. An image signal transmitting method comprising the steps of:
   processing a first image signal as a still image by field offset sub-sampling, said first image signal being in a relatively lower region of temporal motion frequency in a frequency band;
   processing the first image signal processed by field offset sub-sampling, in accordance with frame/line offset sub-sampling;
   processing a second image signal as a moving image by line offset sub-sampling, said second image signal being in a relatively higher region of temporal motion frequency in the frequency band;
   processing a third image signal which is in a middle region of temporal motion frequency between said lower temporal frequency region and said higher temporal frequency region by field offset sub-sampling;
   each of said sub-sampling having the same sampling points for said first, second and third image signals; and
   transmitting each of the image signals sampled on the same sampling points.

* * * * *